United States Patent [19]

Hicks

[11] Patent Number: 4,459,517

[45] Date of Patent: Jul. 10, 1984

[54] HORIZONTAL OUTPUT TRANSISTOR PROTECTION CIRCUIT

[75] Inventor: James E. Hicks, New Palestine, Ind.

[73] Assignee: RCA Corporation, New York, N.Y.

[21] Appl. No.: 394,036

[22] Filed: Jun. 30, 1982

[51] Int. Cl.³ .................. H01J 29/70; H01J 29/76
[52] U.S. Cl. .................................................. 315/408
[58] Field of Search .................. 315/381, 411, 408; 358/243, 190

[56] References Cited

U.S. PATENT DOCUMENTS

| | | | |
|---|---|---|---|
| 3,858,084 | 12/1974 | Manners | 315/387 |
| 4,045,742 | 8/1977 | Meehan et al. | 328/9 |
| 4,047,078 | 9/1977 | Meehan | 315/411 |
| 4,074,323 | 2/1978 | Griffey | 358/243 |
| 4,090,111 | 5/1978 | Suzuki | 358/243 |
| 4,147,964 | 4/1979 | Luz et al. | 358/243 |
| 4,198,661 | 4/1980 | Gatten et al. | 358/243 |
| 4,234,829 | 11/1980 | Willis | 358/243 |

OTHER PUBLICATIONS

Schematic Diagram-CTC-85 Television Receiver.
Mitchell, The CTC 85 Color Chassis Technical Manual, 1977, pp. 61-66.

Primary Examiner—Theodore M. Blum
Attorney, Agent, or Firm—Paul J. Rasmussen; Peter M. Emanuel; Scott J. Stevens

[57] ABSTRACT

In a television receiver having an SCR switching regulator power supply, excessive power supply loading or high line voltage may cause abnormal operation of the switching SCR resulting in a rapid variation of the regulated supply voltage above its regulated level. This voltage variation causes high peak current in the horizontal output transistor, causing it to fail. A detector circuit monitors both the average current and the peak current through the horizontal output transistor and causes the receiver to be disabled in the event either current level becomes excessive.

4 Claims, 1 Drawing Figure

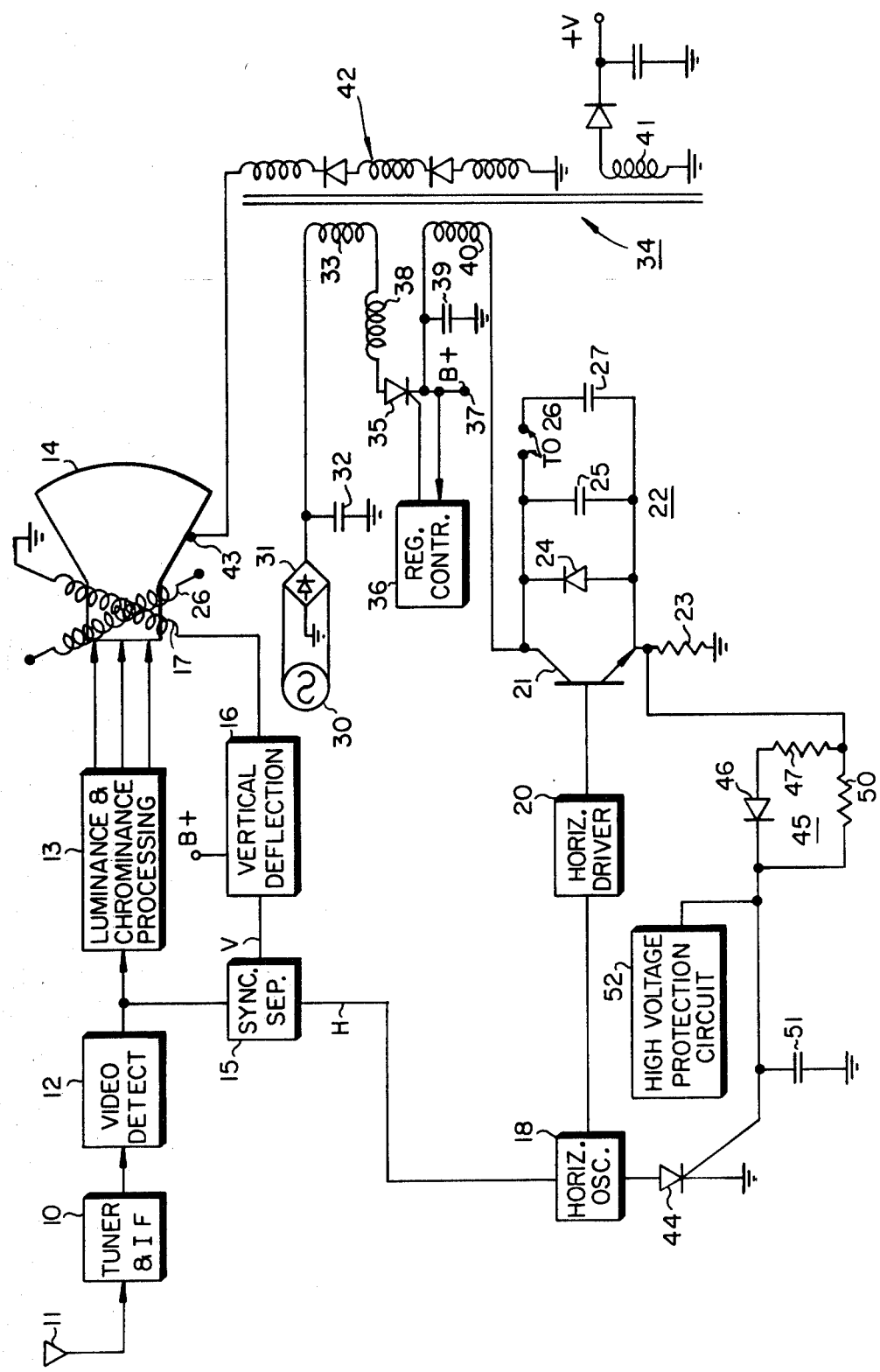

HORIZONTAL OUTPUT TRANSISTOR PROTECTION CIRCUIT

This invention relates to protection circuits for television receivers and in particular to protection circuits for use in receivers having switching regulator power supplies.

Many of the circuits of a television receiver require precise regulated voltages to maintain reliable operation. The AC line voltage may vary significantly and by itself is inappropriate for generating the necessary receiver operating voltages. Therefore, some form of voltage regulator circuit is required.

One common form of regulator is a switching regulator such as is disclosed in U.S. Pat. No. 4,321,514 issued Mar. 23, 1982, in the naves of Thibodeau et al. and entitled "COMMUTATED SCR REGULATOR FOR A HORIZONTAL DEFLECTION CIRCUIT". The SCR conducts current from the unregulated line supply during a controlled period of time to charge a capacitor in order to develop a regulated B+ supply voltage. The conduction time of the SCR is determined by several factors, including the amount of power supply loading and the unregulated line voltage. The SCR is normally triggered into conduction at some time during the horizontal trace interval and commutated off by horizontal retrace pulses at the end of the horizontal trace interval. Regulator control circuitry monitors the regulated B+ voltage and increases or decreases the SCR conduction time to maintain a constant regulated voltage level.

Under certain unusual or fault conditions, the regulator SCR fails to turn off at the end of the horizontal interval. This may be caused by a combination of excessive power supply loading, high AC supply voltages, or any condition including component failures which causes high peak SCR current. High SCR current and/or a high unregulated supply voltage requires a higher than normal voltage level or a longer interval to commutate the regulator SCR off. If this turnoff voltage requirement increases significantly, the retrace pulse may not be of sufficient amplitude to turn off the SCR within the allotted retrace interval. The SCR will then continue to conduct during the following horizontal trace interval causing the regulated B+ voltage to rise above its proper level. If the malfunction-causing condition remains, the SCR may remain in constant conduction for several horizontal intervals, or until the regulated voltage increases such that the SCR can no longer conduct. The SCR will then remain off for several horizontal intervals until the regulator control circuit determines that the regulated voltage is below its proper level. If the unusual or fault condition persists, the previously described abnormal cycle will recur, causing the regulated supply voltage to rapidly fluctuate between the regulated level and a level which may be above the level of the unregulated supply.

An increase in the regulated supply voltage may place an undesirable stress on some receiver components and circuits. In particular, the peak emitter voltage of the horizontal output transistor may increase significantly, such that the horizontal output transistor is rapidly destroyed. It is therefore important to prevent such abnormal SCR operation from continuing in order to protect the receiver.

The present invention is directed to an arrangement which disables the receiver when abnormal SCR regulator operation is detected.

In accordance with the present invention, in a television receiver having a regulated voltage power supply incorporating an SCR for producing a regulated voltage level, an abnormal receiver operating condition may cause abnormal operation of the SCR resulting in a variation of the regulated voltage level. Receiver protection apparatus comprises circuitry for detecting the presence of the voltage level variation and receiver disabling circuitry coupled to the detector for rendering the receiver inoperative upon the detection of a varying regulated voltage level.

The sole FIGURE of the accompanying drawing illustrates in schematic and block diagrams a television receiver incorporating the protection circuit of the present invention.

In the television receiver shown in the drawing, radio frequency broadcast signals are applied to tuning and intermediate frequency (IF) circuits 10 via an antenna 11. Video detector circuitry 12 demodulates the IF signal to produce a composite video signal which includes video program information and synchronizing signal components.

The composite video signal is applied to luminance and chrominance processing circuits 13 which provides the appropriate color drive signals (designated R,G,B) to a three beam kinescope 14. The composite video signal is also applied to a synchronizing (sync) pulse separator 15 which removes the receiver synchronizing information from the composite video signal to produce a composite sync signal having vertical and horizontal synchronizing components. Sync separator 15 further processes the composite sync signal to generate horizontal sync pulses on a conductor H and vertical sync pulses on a conductor V.

The vertical sync pulses on conductor V are applied to vertical deflection circuitry 16 which produces electron beam scanning current to a vertical deflection winding 17 located on kinescope 14. The vertical sync pulses accurately synchronize the operation of vertical deflection circuit 16 to provide a stable scanned raster.

Horizontal sync pulses on conductor H are applied to a horizontal oscillator 18 which may include one or more phase lock loop circuits to provide automatic frequency control for the horizontal rate signal generated by oscillator 18. Horizontal oscillator 18 develops horizontal rate switching signals which are applied to a horizontal driver circuit 20. Horizontal rate drive pulses are then coupled to the base of a horizontal output transistor 21, which forms part of a conventional horizontal output circuit 22. In addition to horizontal output transistor 21, output circuit 22 comprises an output transistor emitter resistor 23, a damper diode 24, a retrace capacitor 25, a horizontal deflection winding 26 located on kinescope 14, and a deflection current S-shaping capacitor 27.

Power is applied to the receiver from the AC line supply 30 through a bridge rectifier 31. The rectified current charges a supply capacitor 32 to develop an unregulated B+ voltage. The unregulated B+ supply is coupled through a winding 33 of a high voltage transformer 34 and a series inductor 38 to the anode of an SCR 35. SCR 35 comprises a portion of a known conventional switching voltage regulator. A regulator control circuit 36 produces pulse width regulated gating signals to the gate of SCR 35, such that a regulated B+ voltage appears at its cathode. The regulated B+ voltage at a terminal 37 is filtered by capacitor 39 and applied to regulator control circuit 36 and to various receiver circuits, such as a vertical deflection circuit 16, and through a primary winding 40 of transformer 34 to the collector of horizontal output transistor 21.

High voltage transformer 34 is shown as including representative secondary windings for producing operating voltages for other receiver circuits. For example, secondary winding 41 illustratively produces a voltage which is rectified and filtered to provide a low voltage +V supply for receiver integrated circuits, such as horizontal oscillator 18. Secondary windings 42 rectify horizontal retrace pulses to develop an ultor voltage of the order of 25 KV to 30 KV which is applied to ultor terminal 43 on kinescope 14.

An SCR 44 is shown coupled between horizontal oscillator 18 and ground. SCR 44 is poled to short operating current from oscillator 18, thereby disabling the receiver, in response to trigger signals at its gate. The use of an SCR to disable a television receiver in this manner is described in a copending U.S. patent application Ser. No. 298,389 in the name of R. Kliebphipat et al. and entitled "TELEVISION RECEIVER DISABLING CIRCUIT". Other embodiments of disabling circuits are of course possible.

The gate of SCR 44 is coupled to a high voltage protection circuit 52 and to one end of a detector network 45 comprising a filter capacitor 51 and the combination of a diode 46 and a resistor 47 in parallel with a resistor 50, with the cathode of diode 46 coupled to the gate of SCR 44. The other end of detector network 45 is coupled to the emitter of horizontal output transistor 21.

During normal receiver operation, regulator control circuit 36 will vary the conduction time of SCR 35 by variable timing gating pulses which occur during each horizontal trace interval in order to maintain a constant regulated B+ voltage. Horizontal retrace pulses appear across winding 33 in order to commutate SCR 35 off each horizontal cycle. Under certain abnormal or unusual conditions, such as a high line voltage, or severe regulated supply loading resulting in a high SCR peak current, the retrace pulses on winding 33 may be of insufficient amplitude to commutate SCR 35 off within the allotted retrace interval. SCR 35 will continue to conduct during the following horizontal trace interval, even in the absence of trigger pulses, causing the regulated voltage level to rise undesirably. If the previously described abnormal condition remains, the SCR may not turn off for several horizontal intervals. The SCR will continue to conduct until the regulated voltage level approaches or even exceeds the unregulated voltage level such that the forward drop across SCR 35 is insufficient to keep it conductive. SCR 35 will then remain off for several horizontal intervals or until the regulated voltage falls below the regulated level such that regulator control circuit 36 again produces gating pulses. A persistence of the described abnormal condition may again result in a failure of SCR 35 to commutate off, repeating the described cycle.

The variation of the regulated supply voltage places unusual demands on the receiver components. In particular, an increase in the regulated voltage greatly increases the peak current in the horizontal output transistor, resulting in a failure of the transistor after only a short time.

Resistor 50 of detector network 45 monitors the average emitter current of horizontal output transistor 21 such that SCR 44 is gated in order to disable the receiver in the event high average emitter current, which could damage the transistor, is detected. Resistor 50 is responsive to the average emitter current and senses a transistor overcurrent condition such as may be caused by a receiver fault. Resistor 50 is not responsive to the previously described abnormal variation of the regulated voltage level, since the average emitter current of transistor 21 will not change substantially as a result of the previously described abnormal operation of the SCR regulator. In accordance with the invention, therefore, a peak or threshold voltage detector comprising diode 46 and resistor 47 is provided in order to sense the increase in peak emitter current of horizontal output transistor 21. The resistance of resistor 47 is of a lower resistance value than that of resistor 50 in order to respond to the peak emitter current of transistor 21. In an illustrative embodiment, resistor 50 is 4700 ohms, resistor 47 is 1200 ohms, and capacitor 51 is 33 $\mu$F.

During normal operation, the voltage across resistor 23 is insufficient to cause conduction of diode 46. Current is conducted through resistor 50, which monitors average current, to charge capacitor 51. The charge on capacitor 51 is not sufficient to turn on SCR 44 under normal circumstances. Under high peak emitter current conditions, such as occur during the previously described abnormal SCR regulator operation, diode 46 conducts and capacitor 51 is charged to a level sufficient to turn SCR 44 on, thereby disabling the receiver. Also, under high average emitter current conditions, resistor 50 will conduct enough current to charge capacitor 51 sufficiently to turn SCR 44 on. Detector network 45 therefore operates as a nonlinear detector having two time constants.

Detector network 45 protects the television receiver against damage due to excessive output transistor current levels, and due to abnormal operation of the switching voltage regulator due to excessive power supply loading or abnormally high line voltages.

What is claimed is:
1. A television receiver protection circuit comprising:
a deflection circuit incorporating an output transistor;
means coupled to said output transistor for developing a current sensing voltage that is representative of current flow through said transistor;
a nonlinear detector coupled to said current sensing voltage developing means for developing a detected voltage between first and second terminals, said nonlinear detector including a capacitor coupled between said first and second terminals, a first resistor coupled to said capacitor and to said current sensing voltage developing means, and a diode coupled in parallel with said first resistor; said capacitor, first resistor, and diode forming an integrator having associated therewith a first time constant when said diode is conducting and a second time constant when said diode is not conducting in order to integrate said current sensing voltage for developing said detected voltage across said first and second terminals; and
means coupled to said nonlinear detector for generating a disabling signal for said receiver in response to said detected voltage, said first time constant being selected to generate said disabling signal when said current sensing voltage is representative of a first fault current flow characteristic through said transistor, said second time constant being selected to generate said disabling signal when said current sensing voltage is representative of a second, different fault current flow characteristic through said transistor.

2. The arrangement defined in claim 1, wherein said current sensing voltage developing means comprises a second resistor coupled between the emitter of said output transistor and a point of reference potential.

3. The arrangement defined in claim 1, wherein said nonlinear detector comprises a peak detector incorporating a third resistor in series with said diode responsive to the peak current flow in said current sensing voltage developing means and an average current detector responsive to the average current flow in said current sensing voltage developing means.

4. The arrangement defined in claim 1, wherein said disabling means comprises an SCR coupled to said deflection circuit for disrupting the operation of said deflection circuit.

* * * * *